United States Patent [19]
Winters et al.

[11] Patent Number: 5,915,438
[45] Date of Patent: Jun. 29, 1999

[54] MOBILE WORK STATION FOR CLEAN ROOM ENVIRONMENTS

[75] Inventors: Toby Winters, Austin; Bill Brown, Round Rock; Stephanie Grahn, Austin, all of Tex.

[73] Assignee: Advanced Micros Devices Inc., Sunnyvale, Calif.

[21] Appl. No.: 08/938,635

[22] Filed: Sep. 26, 1997

[51] Int. Cl.⁶ ...................................................... A47L 5/00
[52] U.S. Cl. ................................ 15/301; 15/310; 15/323
[58] Field of Search .............................. 15/301, 310, 323; 312/1, 213, 210.5, 229; 55/431, 467

[56] References Cited

U.S. PATENT DOCUMENTS

| | | | |
|---|---|---|---|
| 2,170,528 | 8/1939 | Gibbons | 15/310 |
| 2,519,254 | 8/1950 | Kersky | 15/310 |
| 2,724,856 | 11/1955 | Conkey | 15/310 |
| 2,764,776 | 10/1956 | Peguero | 15/310 |
| 4,594,747 | 6/1986 | Dempsey | 15/301 |

*Primary Examiner*—Robert Warden
*Assistant Examiner*—Theresa T. Snider
*Attorney, Agent, or Firm*—Foley & Lardner

[57] ABSTRACT

A fabrication clean room work station is portable and has a funnel-shaped cleaning area which is connected to a vacuum source through a bottom opening. The work station also has a perforated cover positioned across a top opening of the cleaning area to provide a work surface, a catch screen positioned across the bottom opening of the cleaning area to catch dropped parts, a funnel cover which slides over the cleaning area to enclose it, and a flexible tubing in communication with a port formed in the cleaning area. The port is positioned above the catch screen so that any parts vacuumed through the flexible tubing would be stopped by the catch screen. The vacuum source supplies vacuum at the work surface and at the flexible tubing. The vacuum at the flexible tubing is increased when the funnel cover is positioned above the cleaning area.

20 Claims, 3 Drawing Sheets

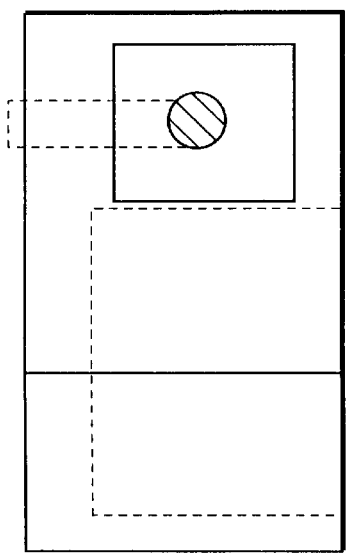
FIG. 2A
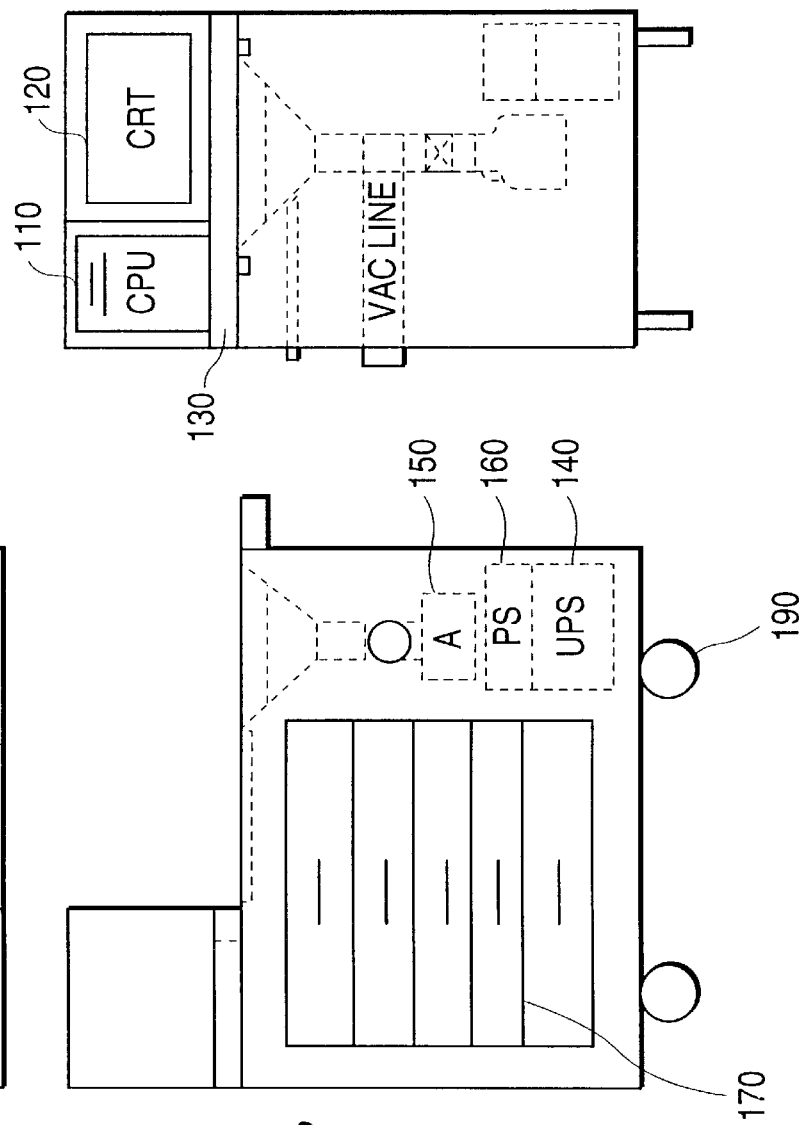
FIG. 2B
FIG. 2C

MOBILE WORK STATION FOR CLEAN ROOM ENVIRONMENTS

BACKGROUND OF THE INVENTION

1. Field of the Invention

The invention relates generally to a work station, more particularly to a mobile work station used in environments having stringent particle generation requirements such as a fabrication clean room.

2. Description of the Related Art

Fabrication clean rooms, for example fabrication rooms for manufacturing submicron wafers for computer microchips, however, have stringent requirements for particulate generation. Contamination of the manufacturing process from particulates has become a serious concern.

Conventional mobile work stations, in fabrication clean rooms, are typically used as a combination work table/tool cart. Such work stations provide technicians a work table which can be ported to and used at different parts of the fabrication clean room. They also provide areas for storing tools so that the tools will be accessible to the technicians at the different parts of the fabrication clean rooms.

A drawback of the conventional mobile work stations is that when technicians handle abrasive or particle producing materials, unwanted particulates are generated. A mobile work station which reduces unwanted particulates would represent a substantial advance in this art.

SUMMARY OF THE INVENTION

An objective of the invention is to provide a mobile work station which has a work area to which vacuum is provided for minimizing particulate generation.

Another objective of the invention is to provide a mobile work station which provides technicians a place to complete equipment repairs without generating unwanted particulates.

Still another objective of the invention is to provide a work station having a cleaning area which functions additionally as a monitoring station, an uninterruptable power supply, a telephone station, and a storage station.

The above and other objects of the invention are accomplished with a fabrication clean room work station which has a funnel-shaped cleaning area connected to a vacuum source through a bottom opening. The work station also has a perforated cover positioned across a top opening of the cleaning area to provide a work surface, a catch screen positioned across the bottom opening of the cleaning area to catch dropped parts, a funnel cover which slides over the cleaning area to enclose it, and a flexible tubing in communication with a port formed in the cleaning area. The port is positioned above the catch screen so that any parts vacuumed through the flexible tubing would be stopped by the catch screen. The vacuum source supplies vacuum at the work surface and at the flexible tubing. The vacuum at the flexible tubing is increased when the funnel cover is positioned above and encloses the cleaning area.

The fabrication clean room work station may further include a computer having a monitor and a pull-out keyboard and an uninterruptable power supply powering the computer and other equipment which tests parts handled at the work station. The computer permits a work station user to monitor other equipment in the fabrication clean room. Other features of the work station include connections for hooking the computer into a computer network, telephone connections, drawers and a cabinet for storing tools and supplies, and wheels made of low particulate material upon which the work station is mounted.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

The invention is described in detail herein with reference to the drawings in which:

FIGS. 2A–2D illustrates the top (FIG. 2A), front (FIG. 2B), right side (FIG. 2C) and rear (FIG. 2D) views of the work station according to a second embodiment of the invention.

DETAILED DESCRIPTION OF THE PREFERRED EMBODIMENTS

Figure 1:
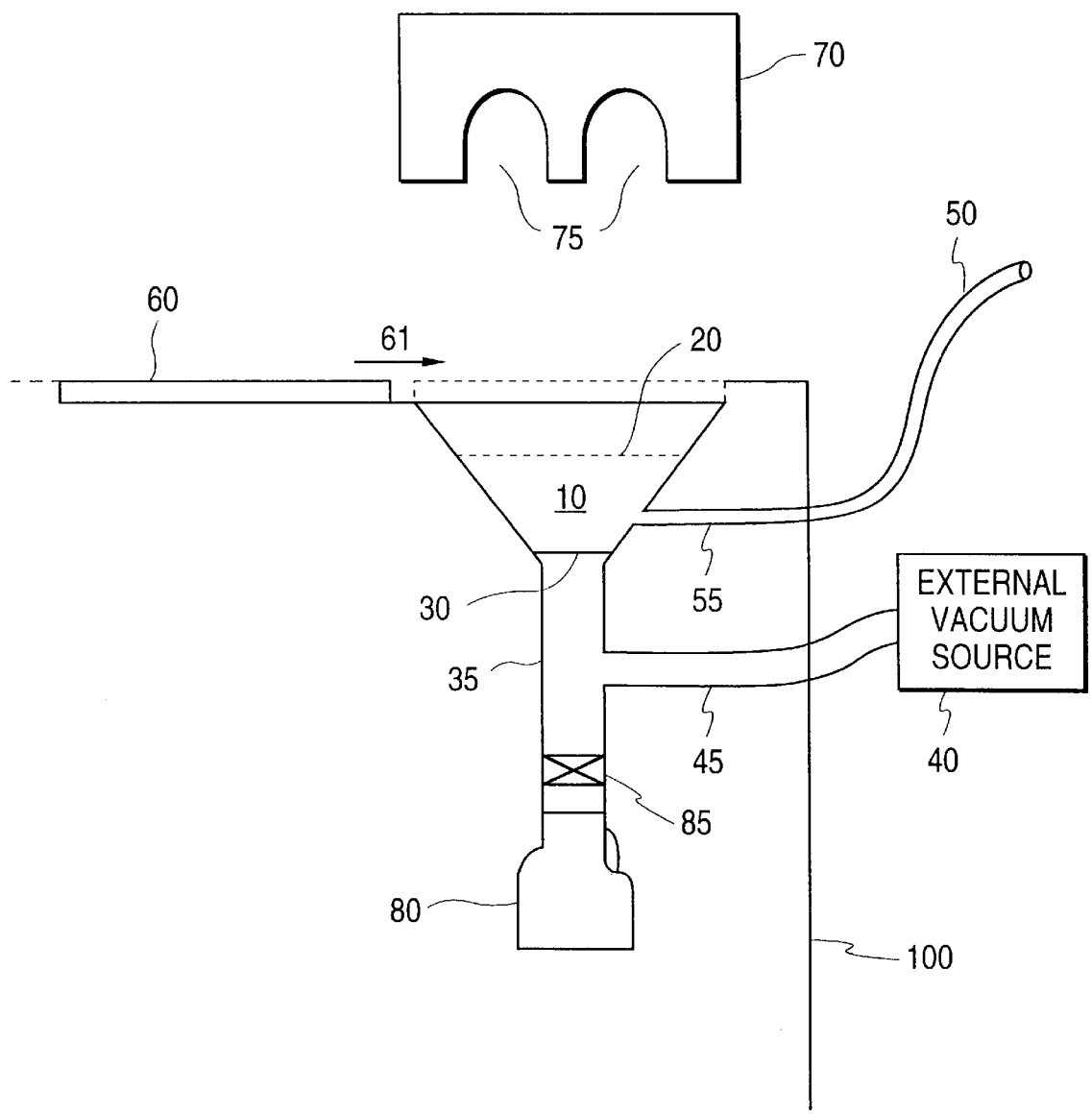
FIG. 1 is a schematic view of the work station according to a first embodiment of the invention.
Figure 2D:
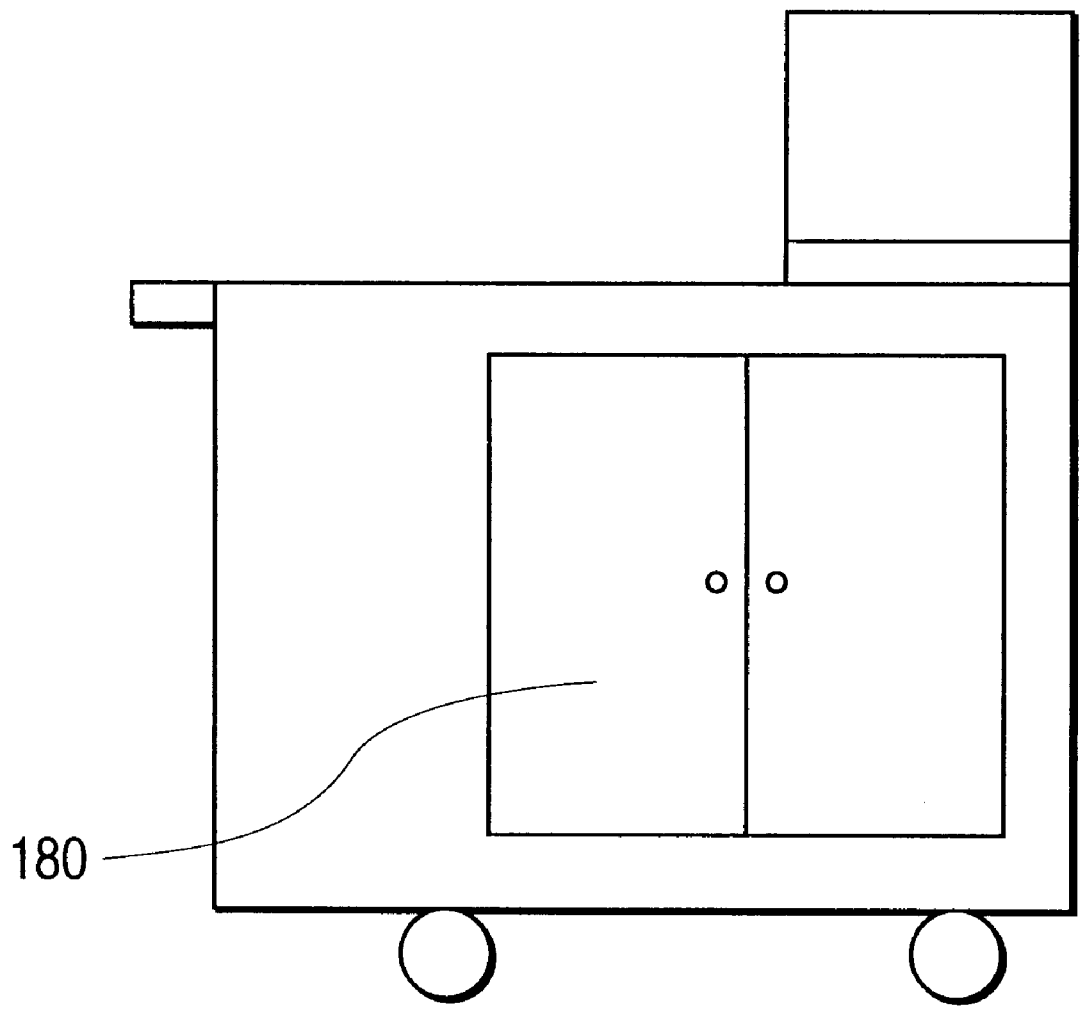

FIG. 1 is a schematic view of the work station according to a first embodiment of the invention. The work station 100 is shown in FIGS. 1 and 2 to be a rectangular casing, but it may take on other shapes as well. Preferably, it is rectangular and has a flat upper surface through which a funnel-shaped cleaning area 10 and a funnel extension 35 is mounted. The cleaning area 10 has disposed therein a perforated cover 20 which is positioned across a top portion of the funnel-shaped cleaning area 10. The top surface of the perforated cover 20 defines a work surface for the cleaning area 10. At or near the bottom of the cleaning area 10, there is provided a catch screen 30 which is also perforated. The catch screen 30 is positioned across a bottom opening of the cleaning area 10. The catch screen 30 receives parts which are inadvertently dropped through the perforated work surface 20. Therefore the perforations of the catch screen 30 are smaller than the perforations of the cover 20. A funnel cover 60 is provided to slide atop (in the direction shown by arrow 61) and to enclose the cleaning area 10. Once enclosed, the cleaning area 10 may be opened by sliding the funnel cover 60 in the opposite direction.

The funnel extension 35 is connected to an external vacuum source 40 through port 45 and a drain 80 through a valve 85, which is preferably a quarter turn manual valve.

The vacuum source 40 supplies vacuum at the perforated work surface 20 and other portions of the cleaning area 10 to draw in particulates generated in these areas. The vacuum source 40 is typically available in all areas of the fabrication clean room. As a result, as the work station 100 is ported to different parts of the fabrication clean room, vacuum will be available for the work station 100. When the funnel cover 60 is in place (shown in FIG. 1 in dotted lines) and encloses the cleaning area 10, vacuum which is supplied at a flexible tube 50 through port 55 connected to a side surface of the cleaning area 10 is increased. The flexible tube 50 may then be used for detailed cleaning and small parts retrieval. Any small parts drawn through the flexible tube 50 will be caught on the catch screen 30. Since parts to be drawn through the flexible tube 50 are caught on the catch screen, the opening of the flexible tube 50 is larger than the perforations of the catch screen.

Also, in order to increase vacuum at the work surface of the cleaning area 10, a shroud 70 may be provided atop the cleaning area 10. The shroud 70 has dual openings 75 so that an operator's hands can be inserted into the openings for manipulating items to be cleaned at the work surface. The shroud 70 is designed to be removable so that the operator has the option of using it or not.

Liquids, such as deionized water and isopropyl alcohol, are used during rinse of small parts and rinse of the cleaning area 10. The drain 80 is provided for collecting the liquid which is drained through the funnel-shaped cleaning area 10. The drain connection is typically a bottle connection such that a one-gallon bottle can screw onto it and operate as the drain 80. Since some of the parts cleaned at the station may generate toxic by-products, draining into a removable bottle will allow for proper disposal. FIG. 2 illustrates the top, front and side views of the work station according to a second embodiment of the present invention. The second embodiment of the invention includes all of the elements of the first embodiment as described above. The reference numerals corresponding to the first embodiment, however, are not shown in FIG. 2.

A computer 110, a monitor 120, and a pull-out keyboard 130 will be installed at one end of the work station opposite to the cleaning area. Since many parts that are cleaned at the work station take considerable time to clean, an operator must be able to keep in touch with other developments in the fabrication clean room. The computer would allow the station user to monitor other equipment in the laboratory and react to any problems that may arise.

Power for the computer will come from an uninterruptable power supply (UPS) 140 mounted at the bottom of the work station. A port 150 (indicated as "AA" in FIG. 2B) on the side of the work station will house the 110 vac input which powers the UPS and additional power outlets. This "A" port will also have connections for hooking into the computer network, and telephone lines. The 110 vac line will also be connected to a power supply (PS) 160 in the bottom of the work station for producing dc voltage sources of 24 vdc, +/−15 vdc and 5 vdc. The dc voltage sources allow the testing of various parts that have been cleaned or rebuilt at the cleaning station.

Additionally, the work station will have drawers 170 on one side and a cabinet 180 on the other for storing tools and supplies. The work station will be mounted on four wheels 190 of low particulate material such as polypropylene.

While particular embodiments according to the invention have been illustrated and described above, it will be clear that the invention can take a variety of forms and embodiments within the scope of the appended claims.

We claim:

1. A work station comprising:
   a casing having a cleaning area, said cleaning area having a top opening formed through a top surface of said casing and a bottom opening connected to a vacuum source;
   a perforated cover positioned across the top opening of said cleaning area to provide a work surface; and
   a catch screen covering the bottom opening of said cleaning area.

2. A work station according to claim 1, wherein said cleaning area is funnel-shaped.

3. A work station according to claim 2, wherein said casing is a movable carriage having a plurality of wheels.

4. A work station according to claim 3, further comprising a funnel cover which slides over and encloses the top opening of said cleaning area.

5. A work station according to claim 4, further comprising a flexible tubing in communication with a port formed in said cleaning area, said port being positioned above said catch screen, wherein said vacuum source also supplies vacuum through said flexible tubing, said vacuum through said flexible tubing increasing when said funnel cover encloses said cleaning area.

6. A work station according to claim 3, further comprising a shroud for said cleaning area, said shroud having openings for manual access to the work surface of said cleaning area.

7. A work station according to claim 2, further comprising a funnel extension at the bottom of said cleaning area, said funnel extension being connected to a drain.

8. A work station according to claim 7, further comprising a valve positioned between said funnel extension and said drain.

9. A work station ac cording to claim 8, wherein said drain is a removable container.

10. A fabrication clean room work station comprising:
    a carriage;
    a funnel-shaped cleaning area provided through a top surface of said carriage, said cleaning area being connected to a vacuum source through a bottom opening;
    a perforated cover positioned across a top of said cleaning area to provide a work surface;
    a catch screen covering the bottom opening of said cleaning area;
    a funnel cover which slides over and encloses said cleaning area; and
    a flexible tubing in communication with a port formed in said cleaning area, said port being positioned above said catch screen,
    wherein said vacuum source supplies vacuum at said perforated cover and at said flexible tubing, said vacuum at said flexible tubing increasing when said sliding cover encloses said cleaning area.

11. A fabrication clean room work station according to claim 10, further comprising a computer including a monitor and a pull-out keyboard and an uninterruptable power supply powering said computer, said computer permitting a work station user to monitor other equipment in said fabrication clean room.

12. A fabrication clean room work station according to claim 11, wherein said power supply powers equipment for testing parts handled at said work station.

13. A fabrication clean room work station according to claim 11, further comprising connections for hooking said computer into a computer network.

14. A fabrication clean room work station according to claim 11, further comprising telephone connections.

15. A fabrication clean room work station according to claim 11, further comprising drawers and a cabinet for storing tools and supplies.

16. A fabrication clean room work station according to claim 11, wherein said carriage is mounted on a plurality of wheels made of low particulate material.

17. A cleaning station comprising:
    a casing having a cleaning area formed through a top surface thereof, said cleaning area being connected to a vacuum source;
    a performed cover positioned across a top portion of said cleaning area to provide a work surface;
    a screen provided in said cleaning area for catching dropped parts; and
    a flexible tube in communication with said vacuum source through a port formed in said cleaning area.

18. A cleaning station according to claim 17, further comprising a slidable cover completely enclosing a top opening of said cleaning area.

19. A cleaning station according to claim 18, wherein an opening of said flexible tubing is larger than an opening of said catch screen and parts vacuumed through said flexible tubing is caught by said screen.

20. A cleaning station according to claim 19, wherein said perforations of said perforated cover are larger than perforations of said screen.

* * * * *

UNITED STATES PATENT AND TRADEMARK OFFICE
CERTIFICATE OF CORRECTION

PATENT NO.   : 5,915,438
DATED        : June 29, 1999
INVENTOR(S)  : Toby WINTERS et al It is certified that error appears in the above-identified patent and that said Letters Patent is hereby corrected as shown below:

On the title page, item [73] Assignee, contains a typographical error wherein "Advanced Micros Devices Inc." should read --Advanced Micro Devices Inc.--.

Signed and Sealed this

Seventh Day of December, 1999

Attest:

Q. TODD DICKINSON

*Attesting Officer*   *Acting Commissioner of Patents and Trademarks*